United States Patent [19]
Maxey

[11] 3,852,250
[45] Dec. 3, 1974

[54] VULCANIZATION SYSTEM CONTAINING A THREE-COMPONENT ACCELERATOR SYSTEM
[75] Inventor: Frank S. Maxey, Akron, Ohio
[73] Assignee: The Goodyear Tire & Rubber Company, Akron, Ohio
[22] Filed: Apr. 18, 1972
[21] Appl. No.: 245,263

[52] U.S. Cl. ...... 260/79.5 B, 252/182, 260/79.5 C, 260/785, 260/786
[51] Int. Cl. .... C08c 11/62, C08d 9/00, C08f 27/06
[58] Field of Search .......... 260/79.5 R, 79.5 B, 785, 260/786, 795, 798, 779; 252/182

[56] References Cited
UNITED STATES PATENTS
2,927,099  3/1960  Railsback.......................... 260/79.5
3,557,028  1/1971  Turk................................... 260/5

Primary Examiner—Christopher A. Henderson
Attorney, Agent, or Firm—F. W. Brunner; J. A. Rozmajzl

[57] ABSTRACT

Three-component accelerator system for the vulcanization of rubber, one accelerator being 2-(morpholinodithio)-benzothiazole, a second accelerator being a compound such as 2-(morpholinothio)-benzothiazole, and a third accelerator being morpholine disulfide.

8 Claims, No Drawings

VULCANIZATION SYSTEM CONTAINING A THREE-COMPONENT ACCELERATOR SYSTEM

This invention relates to an improved accelerator system for the vulcanization of rubber. More particularly it relates to a three-component accelerator system which provides a vulcanized rubber possessing improved physical properties.

Rubber compounders are constantly searching for improved accelerator systems for the sulfur vulcanization of rubber. Such accelerator systems should preferably provide good scorch resistance, reasonable vulcanization rates and adequate physical properties, both aged and unaged.

It is an object of this invention to provide an accelerator system to be used in the vulcanization of rubber. It is a further object of this invention to provide an accelerator system which provides, on vulcanization, a vulcanizate having improved physical properties. It is another object of this invention to provide vulcanizable rubber compositions which are capable of being vulcanized to provide improved vulcanizates. Other objects will become apparent subsequently herein.

The objects of the present invention are accomplished by vulcanizing a rubbery composition containing an accelerator system comprising (A) 2-(morpholinodithio)-benzothiazole, (B) a second accelerator which is a benzothiazole and (C) morpholine disulfide.

The second accelerator preferably has the following structural formula:

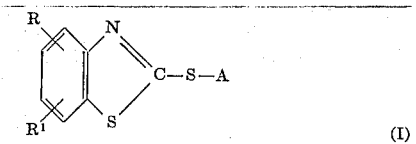

(I)

wherein A is selected from the group consisting of hydrogen,

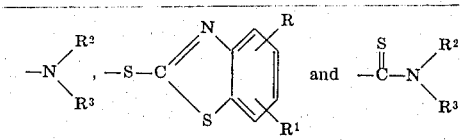

wherein R and R¹ are selected from the group consisting of hydrogen, nitro, chloro, alkyl radicals having from 1 to 4 carbon atoms and alkoxy radicals having from 1 to 4 carbon atoms and wherein $R^2$ and $R^3$ are selected from the group consisting of alkyl radicals having from 1 to 6 carbon atoms, cycloalkyl radicals having from 5 to 12 carbon atoms, aralkyl radicals having from 7 to 13 carbon atoms and aryl radicals having from 6 to 12 carbon atoms and $R^2$ and $R^3$ can be joined through a member selected from the group consisting of —CH₂—, —O— and —S— to constitute with the attached nitrogen group of heterocyclic radical. Where A is

$R^3$ can also be hydrogen.

Specific examples of the derivative of the second accelerator conforming to above recited structural formula I when A is

are represented below by a listing of specific radicals, any combination of which in structural formula I above represents a specific second accelerator. R and R¹ can be the same or different.

| R | R¹ | (R²–R³) | Where R² and R³ together with the nitrogen form a heterocyclic ring |
|---|---|---|---|
| hydrogen | methyl | methyl | morpholino |
| methyl | ethyl | ethyl | pyrrolidinyl |
| methoxy | isopropyl | isopropyl | piperidino |
| ethoxy | cyanoethyl | cyanoethyl | cyclohexamethyleneamino |
| nitro | n-butyl | n-butyl | 2,6-dimethylmorpholino |
| chloro | sec.butyl | sec.butyl | thiomorpholino |
|  | tert.butyl | tert.butyl | N-methylpiperizinyl |
|  | cyclohexyl | cyclohexyl | 3-methylpiperidino |
|  |  |  | 2-methylpiperidino |
|  |  |  | 4-methylpiperidino |

Particularly preferred second accelerators are the following.

benzothiazyl disulfide
2-(morpholinothio)-benzothiazole
N-(cyclohexyl)-2-benzothiazolesulfenamide
N-(t-butyl)-2-benzothiazolesulfenamide
N,N-(diisopropyl)-2-benzothiazolesulfenamide
2-(2,6-dimethylmorpholinothio)-benzothiazole
N,N-(diethyl)-2-benzothiazolesulfenamide
N-(octyl)-2-benzothiazolesulfenamide
2-(3-methylpiperidinothio)-benzothiazole The following compounds illustrate the second accelerator of structural formula I when A is a substituted or unsubstituted benzothiazole radical.

benzothiazyl disulfide
2-(5-chlorobenzothiazolyl) disulfide
2-(6-nitrobenzothiazolyl) disulfide
2-(6-ethoxybenzothiazolyl) disulfide When A is hydrogen the second accelerator of structural formula I can be a compound such as 2-mercaptobenzothiazole.

When A is

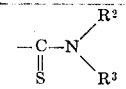

illustrative compounds are as follows.

2-benzothiazyl N,N-dimethylthiocarbamoyl sulfide
2-benzothiazyl N,N-diethylthiocarbamoyl sulfide
2-benzothiazyl N,N-diisopropylthiocarbamoyl sulfide The 2-(morpholinodithio)-benzothiazole (MDB) is well known in the art and can be prepared by well known processes such as that described in U.S. Pat. No. 2,837,519.

The second accelerators are well known in the art and can be prepared by well known processes such as those described in U.S. Pat. Nos. 1,631,871; 2,024,575; 2,045,888; 2,191,656 and 2,615,893.

4,4'-Dithiomorpholine is also well known and can be prepared, for example, according to the process described in U.S. Pat. No. 2,343,524.

The accelerator system of the present invention is used in vulcanizable rubber compositions, compounded and uncompounded, along with 0.00 to 3.25 parts by weight of free sulfur based on 100 parts by weight of uncompounded rubber. The MDB must comprise 20 to 70 percent (preferably 30 to 60 percent) of the total three-component accelerator combination.

The second accelerator comprises 10 to 60 percent (preferably 20 to 40 percent) of the combination. The morpholine disulfide also comprises 10 to 60 percent (preferably 20 to 40 percent) of the combination.

The accelerator level varies from 0.50 to 5.50 parts by weight per 100 parts by weight of uncompounded rubber. Improvements in physical properties are obtained at low sulfur levels and in sulfurless systems, i.e., from 0.00 to and including 1.25 parts of free sulfur based on 100 parts by weight of uncompounded rubber. Improvements are also obtained when a high sulfur level (above 1.25 parts and up to 3.25 parts of free sulfur) is used. The present invention, however, is generally most beneficial at low sulfur levels, such as 0.10 to 1.25 parts.

The sum of the three-component accelerator system and the sulfur ranges from 2.25 to 5.50 parts by weight per 100 parts by weight of rubber.

The accelerator can be compounded into the rubber by any conventional method, such as by addition to the rubber on a mill or a Banbury when the rubber is a solid. The rubbers can contain any conventional compounding ingredients such as carbon black, zinc oxide and even other accelerators to the extent that the accelerators do not interfere substantially with the improvement offered by the accelerator system of the present invention.

The rubber vulcanizates prepared using this accelerator system can be used in any of their normal applications, such as in pneumatic vehicle tires and industrial products.

Some of the following examples are intended to illustrate but not to limit the practice of the present invention. Unless indicated otherwise, all parts are parts by weight.

Natural rubber, SBR (rubbery butadiene-1,3/styrene copolymers) and NBR (rubbery butadiene-1,3/acrylonitrile copolymers) were compounded with the accelerator system of the present invention and both high and low levels of sulfur using conventional Banburying and milling procedures. The productive stocks were then vulcanized and tested.

The non-productive formulations for the compounded rubbers were as follows in parts by weight.

| Ingredients | Formulations | | |
|---|---|---|---|
| | A | B | C |
| Natural | 100.0 | | |
| SBR 1500 | | 100.0 | |
| 67/33 butadiene-1,3/ acrylonitrile | | | 100.0 |
| zinc oxide | 5.0 | 3.0 | 5.0 |
| stearic acid | 1.0 | 2.0 | 1.0 |
| amine antioxidant | 1.0 | 1.0 | 1.0 |
| HAF black | 40.0 | 40.0 | 40.0 |
| petroleum softener | 3.0 | | |
| dibutyl phthalate | | | 5.0 |
| processing oil | | 5.0 | |

Formulation A was used in preparing Examples 1 to 7. Formulation B was used in preparing Examples 8 to 14. Examples 6, 7, and 14 illustrate the practice of the present invention. It is understood in each of the following examples that in addition to the sulfur and accelerator amounts indicated, the rubbers also contained the ingredients indicated in the non-productive formulations recited earlier herein.

Examples 1 to 7 (High Sulfur — Natural Rubber)

| | 1 | 2 | 3 | 4 | 5 | 6 | 7 |
|---|---|---|---|---|---|---|---|
| Sulfur | 2.75 | 2.75 | 2.75 | 2.75 | 2.75 | 2.75 | 2.75 |
| MDB(1) | 0.60 | | | | 0.30 | 0.30 | 0.20 |
| MBTS(2) | | 0.70 | | | | | 0.20 |
| MOR(3) | | | 0.60 | | 0.30 | 0.15 | |
| DTDM(4) | | | | 0.60 | | 0.15 | 0.20 |
| OCT(5) | 20 | 28 | 20 | 40 | 23 | 22 | 26 |
| Scorch(6) | 30 | 30 | 30 | 30+ | 30+ | 30+ | 30+ |
| T(7) | 290 | 256 | 275 | 254 | 297 | 307 | 298 |
| E(7) | 600 | 660 | 600 | 580 | 620 | 600 | 590 |
| 300M(8) | 99 | 85 | 103 | 90 | 105 | 103 | 102 |
| Shore A(8) | 60 | 58 | 61 | 58 | 61 | 60 | 61 |
| Tear(9) | 106 | 86 | 99 | 63 | 95 | 106 | 110 |
| Aged(10) | | | | | | | |
| T | 102 | 87 | 91 | 140 | 123 | 138 | 130 |
| E | 250 | 210 | 260 | 210 | 290 | 320 | 310 |
| Aged | | | | | | | |
| 300 M | — | — | — | — | — | 135 | 127 |
| Shore A | 60 | 56 | 58 | 63 | 63 | 61 | 62 |
| Flex(11) | | | | | | | |
| Orig. | 183 | 153 | 148 | 166 | 171 | 190 | 188 |
| Aged | 133 | 120 | 123 | 100 | 146 | 160 | 170 |
| GF(12) | | | | | | | |
| Orig. | 17.0 | 20.0 | 16.8 | 28.3 | 19.1 | 18.8 | 16.3 |
| Aged | 21.8 | 23.2 | 21.9 | 33.4 | 21.1 | 21.4 | 18.4 |
| Rebound | | | | | | | |
| 25°C. | 73.3 | 73.1 | 73.5 | 74.1 | 73.0 | 73.9 | 73.6 |
| 100°C. | 83.4 | 80.2 | 83.6 | 83.0 | 82.6 | 83.6 | 82.9 |

(1) 2-(morpholinodithio)-benzothiazole
(2) benzothiazyl disulfide
(3) 2-(morpholinothio)-benzothiazole
(4) 4,4'-dithiomorpholine
(5) Optimum cure time (OCT) was determined using the Monsanto Rheometer, 100 CPM 3° arc, 143°C.
(6) Mooney Scorch at 120°C.,Δ5.
(7) T/E is a measure of the tensile strength and elongation (Kg/cm² and %).
(8) 300M is a measurement of the stress at 300% elongation. Shore A is a measure of the hardness as measured by the Shore A durometer.
(9) Crescent tear test (Die C).
(10) Aged T/E is tensile and elongation properties measured after the samples had been aged in a hot air oven for 70 hours at 100°C.
(11) Flex test is the Goodyear 66⅔ Flex test. Original tests were run at 25°C. while aged refers to the flex test results run after the samples had been aged in a hot air oven for 22 hours at 100°C.
(12) Goodrich Flexometer,ΔT(°C.)

The results in Examples 1 to 7 indicate that systems of the present invention (Examples 6 and 7) were superior to any of their individual components alone. Note particularly the tear, aged T/E and flex.

Example 14 illustrates the superiority of the system of the present invention. Note particularly the Aged T/E, Aged Flex and Rebound, but most particularly note the Compression Set.

Examples 17 and 18 illustrate the superiority of vulcanizates prepared using the three-component accelerator system of the present invention in a sulfurless vulcanization system. Note particularly Tear, Aged T/E and Flex.

Formulation A was used at the 0.3 part sulfur level. A 1.0/1.0/1.0 MDB/MOR/DTDM combination, when compared with 3.0 parts of each of the individual com-

| Examples 8 to 14 (Low Sulfur-SBR) | | | | | | | |
|---|---|---|---|---|---|---|---|
| | 8 | 9 | 10 | 11 | 12 | 13 | 14 |
| Sulfur | 0.3 | 0.3 | 0.3 | 0.3 | 0.3 | 0.3 | 0.3 |
| MDB | 3.0 | | | 1.5 | 1.5 | | 1.0 |
| MOR | | 3.0 | | 1.5 | | 1.5 | 1.0 |
| DTDM | | | 3.0 | | 1.5 | 1.5 | 1.0 |
| OCT | 33 | 43 | 50 | 33 | 24 | 30 | 25 |
| Scorch | 30+ | 30+ | 30+ | 30+ | 30+ | 30 | 26 |
| T | 238 | 189 | 224 | 248 | 230 | 210 | 254 |
| E | 530 | 700 | 650 | 560 | 560 | 670 | 570 |
| 300M | 98 | 49 | 58 | 105 | 90 | 68 | 98 |
| Shore A | 62 | 60 | 58 | 61 | 60 | 60 | 64 |
| Tear | 39 | 44 | 42 | 42 | 41 | 41 | 44 |
| Aged | | | | | | | |
| T | 188 | 193 | 210 | 219 | 210 | 200 | 232 |
| E | 420 | 620 | 570 | 490 | 480 | 480 | 510 |
| Aged | | | | | | | |
| 300M | 112 | 63 | 101 | 119 | 120 | 119 | 147 |
| Shore A | 66 | 63 | 57 | 66 | 60 | 64 | 66 |
| Flex | | | | | | | |
| Orig. | 240 | 240+ | 240 | 240+ | 240+ | 240+ | 240+ |
| Aged | 34 | 218 | 227 | 210 | 188 | 138 | 217 |
| GF | | | | | | | |
| Orig. | 34.2 | 77 | 46.5 | 34.2 | 38.6 | 60.1 | 28.3 |
| Aged | 32.4 | 67 | 33.2 | 31.6 | 36.2 | 40.1 | 27.2 |
| Rebound | | | | | | | |
| 25°C. | 62 | 58 | 58 | 63 | 60 | 60 | 66 |
| 100°C. | 74 | 58 | 64 | 72 | 72 | 73 | 77 |
| Set (13) | 40 | 60 | 45 | 43 | 48 | 20.7 | |

(13) Percent recovery after being compressed to 25 percent of its original height and held for 22 hours at 100°C.

The stocks of Examples 15 to 18 were prepared using formulation B. No free sulfur was used. Examples 17 and 18 illustrate the practice of the present invention.

| Examples 15 to 18 (SBR-No Sulfur) | | | | |
|---|---|---|---|---|
| | 15 | 16 | 17 | 18 |
| Sulfur | 0.0 | 0.0 | 0.0 | 0.0 |
| MOR | | | 1.5 | |
| TMTD(14) | 3.0 | | | |
| MDB | | 1.5 | 2.5 | 1.5 |
| DTDM | | 3.0 | 1.0 | 2.5 |
| MBTS | 3.0 | | | 1.0 |
| OCT | 40 | 48 | 44 | 30 |
| Scorch | 30 | 30+ | 30+ | 30 |
| T | 163 | 236 | 242 | 232 |
| E | 310 | 550 | 560 | 520 |
| 300M | 157 | 98 | 101 | 98 |
| Shore A | 63 | 65 | 60 | 61 |
| Tear | 24 | 39 | 46 | 40 |
| Aged | | | | |
| T | 145 | 200 | 222 | 216 |
| E | 210 | 350 | 520 | 470 |
| Aged | | | | |
| 300M | — | 162 | 120 | 122 |
| Shore A | 69 | 67 | 63 | 62 |
| Flex | | | | |
| Orig. | 28 | 240+ | 240+ | 240 |
| Aged | 14 | 109 | 240 | 158 |
| GF | | | | |
| Orig. | 28.7 | 28.8 | 31.6 | 28.4 |
| Aged | 22.9 | 24.8 | 30.4 | 27.0 |
| Rebound | | | | |
| 25°C. | 64 | 65 | 62 | 64 |
| 100°C. | 77 | 81 | 75 | 77 |
| Set | 37 | 51 | 52 | 37 |

(14) tetramethylthiuram disulfide ponents alone possessed superior Compression Set and Goodrich Flexometer characteristics.

Again using formulation A but in a sulfurless system 2.5/1.5/1.0 and 1.0/1.5/2.5 MDB/MOR/DTDM systems were compared with a 3.0/3.5 MOR/DTDM system. Aged T/E, Flex, Goodrich Flexometer and Compression Set characteristics for the three-component systems were superior.

Using formulation B and 1.70 parts of sulfur a 0.33/0.33/0.34 MDB/MOR/DTDM system possessed better aged T/E and aged Flex than any of its components alone or 0.5/0.5 MDB/MOR or 0.5/0.5 MDB/DTDM systems.

Using formulation C and 1.75 parts of sulfur a 0.27/0.27/0.27 MDB/MOR/DTDM system possessed superior aged T/E, Compression Set and aged Flex when compared with each of its individual components alone or 0.40/0.40 MDB/MOR or 0.40/0.40 MDB/DTDM systems.

Using formulation C and a 0.30 part sulfur level a 1.0/1.0/1.0 MDB/MOR/DTDM system provided superior Compression Set and Flex both aged and unaged when compared with each of its individual components alone or a 1.5/1.5 MDB/MOR or 1.5/1.5 MDB/DTDM system.

Using formulation C and no sulfur 1.25/1.00/1.25 and 1.50/1.50/1.50 MDB/MOR/DTDM systems possessed aged T/E and Compression Set superior to a 2.5/1.5 MDB/DTDM system.

Overall, all of the three-component systems tested have what could be considered an overall superior combination of physical properties. Although sometimes inferior in some properties, the vulcanizates prepared using the three-component system were always superior to any system with which it was concerned in at least one of the following properties: aged T/E, Flex (original or aged), Compression Set or Goodrich Flexometer.

The aforementioned properties are quite important in various applications. Compression Set is important with regard to seals and gaskets. Flex is important in belt and tire applications. Aged T/E is important with regard to tires and high temperature belts and hose. Goodrich Flex properties would be considered where a polymer was to be used in a motor mount.

The other accelerator compounds described earlier herein could have been substituted for their counterparts in the preceding working examples to produce vulcanizates with a superior combination of physical properties.

Likewise, various other polymers could have been substituted for those used in the preceding working examples, such as cis-1,4 polyisoprene, cis-1,4 polybutadiene or ethylene/propylene/1,4-hexadiene polymers. Naturally, as the rubber is changed or a different loading is used, standard changes in the compounding recipe would be made to obtain optimum results.

The sulfur vulcanizable rubbers that will benefit from this invention include natural rubber and synthetic rubbers and mixtures thereof. Synthetic rubbers that can be improved by the practice of the present invention include all diene rubbers including the following elastomers, either alone or in blends, cis-1,4 polyisoprene, polybutadiene, including cis-1,4 polybutadiene, rubbery copolymers of 1,3-dienes such as 1,3-butadiene, isoprene or 2,3-dimethyl-1,3-butadiene with other monomers, for example, styrene, acrylonitrile and methyl methacrylate. Ethylene propylene terpolymers (EPDM), i.e., with a non-conjugated diene, for example, terpolymers of ethylene propylene and dicyclopentadiene or 1,4-hexadiene or ethylidene norbornene can also benefit from the present invention. For maximum benefit, the EPDM polymer should be classified as "fast curing" or "ultra fast curing." In fact, for best results any polymer used should vulcanize readily. Chlorinated polymers which possess unsaturation such as polychloroprene will show improved vulcanizate properties when used in the practice of the present invention as will polyalkenamers such as polyoctenamer prepared by a ring opening process involving cyclooctene. Although it is generally preferred that the mole percent unsaturation of the polymer be at least 1.0 percent to 2.0 percent and higher, the source of the double bond must be considered. For example, EPDM polymers prepared using ethylidene norbornene as the termonomer vulcanize more readily than an EPDM polymer prepared using dicyclopentadiene as the termonomer.

While certain representative embodiments and details have been shown for the purpose of illustrating the invention, it will be apparent to those skilled in this art that various changes and modifications may be made therein without departing from the spirit or scope of the invention.

What is claimed is:

1. A sulfur vulcanizable rubber containing 0.00 to 3.25 parts by weight of free sulfur per 100 parts by weight of rubber and 0.5 to 5.50 parts by weight per 100 parts by weight of rubber, of an accelerator system comprising A. 2-(morpholinodithio)-benzothiazole,
B. at least one benzothiazole accelerator having the following structural formula

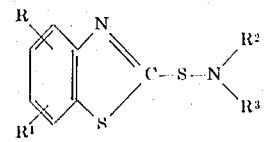

wherein R and $R^1$ are selected from the group consisting of hydrogen, nitro, chloro, alkyl radicals having from 1 to 4 carbon atoms and alkoxy radicals having from 1 to 4 carbon atoms and wherein $R^2$ is selected from the group consisting of alkyl radicals having from 1 to 6 carbon atoms, cycloalkyl radicals having from 5 to 12 carbon atoms, aralkyl radicals having from 7 to 13 carbon atoms and aryl radicals having from 6 to 12 carbon atoms, wherein $R^3$ is selected from hydrogen and the radicals for $R^2$ and $R^2$ and $R^3$ can be joined through a member selected from the group consisting of $-CH_2-$, $-O-$ and $-S-$ to constitute with the attached nitrogen group a heterocyclic radical and C. 4,4'-dithiomorpholine wherein the weight ratio of A/B/C is 20 to 70/10 to 60/10 to 60 based on 100 parts by weight of A, B and C, and wherein the total weight of sulfur plus accelerator system is from 2.25 to 5.50 parts by weight per 100 parts by weight of rubber.

2. A sulfur vulcanizable rubber containing 0.00 to 3.25 parts by weight of free sulfur per 100 parts by weight of rubber and 0.5 to 5.50 parts by weight per 100 parts by weight of rubber, of an accelerator system comprising A. 2-(morpholinodithio)-benzothiazole,
B. at least one benzothiazole accelerator selected from the group consisting of
2-(morpholinothio)-benzothiazole,
N-(cyclohexyl)-2-benzothiazolesulfenamide,
N-(t-butyl)-2-benzothiazolesulfenamide,
N,N-(diisopropyl)-2-benzothiazolesulfenamide,
2-(3,6-dimethylmorpholinothio)-benzothiazole,
N,N-(diethyl)-2-benzothiazolesulfenamide,
N-(octyl)-2-benzothiazolesulfenamide, and
2-(3-methylpiperidinothio)-benzothiazole, and
C. 4,4'-dithiomorpholine wherein the weight ratio A/B/C is 20 to 70/10 to 60/10 to 60 based on 100 parts by weight of A, B and C, and wherein the total weight of sulfur plus accelerator system is from 2.25 to 5.50 parts by weight per 100 parts by weight of rubber.

3. The sulfur vulcanizable rubber according to claim 1 wherein $R^3$ is hydrogen.

4. The sulfur vulcanizable rubber according to claim 1 wherein the sulfur level is from 0.10 to 1.25 parts.

5. The sulfur vulcanizable rubber according to claim 1 wherein the sulfur level is from 1.25 to 3.25 parts.

6. The sulfur vulcanizable rubber according to claim 1 containing as an accelerator a compound selected from the group consisting of N-(cyclohexyl)-2-benzothiazylsulfenamide and 2-(morpholinothio)-benzothiazole.

7. The sulfur vulcanizable rubber according to claim 1 wherein A comprises 30 to 60 percent, B comprises 20 to 40 percent and C comprises 20 to 40 percent by weight of the three-component accelerator system.

8. A process of preparing a rubbery vulcanizate comprising heating the sulfur vulcanizable rubber of claim 1 at a vulcanizing temperature.

* * * * *

PO-1050
(5/69)

UNITED STATES PATENT OFFICE
CERTIFICATE OF CORRECTION

Patent No. 3,852,250                    Dated December 3, 1974

Inventor(s) Frank S. Maxey

It is certified that error appears in the above-identified patent and that said Letters Patent are hereby corrected as shown below:

Column 5, in the table entitled, "Examples 8 to 14(Low Sulfur-SBR)" Example 11, last figure reads "43" and should read -- 40 --; Example 12, last figure reads "48" and should read -- 43 --; Example 13, last figure reads "20.7" and should read -- 48 --; Example 14, last figure was omitted but should read -- 20.7 --.

Signed and sealed this 11th day of March 1975.

(SEAL)
Attest:

RUTH C. MASON
Attesting Officer

C. MARSHALL DANN
Commissioner of Patents
and Trademarks